(12) United States Patent
Freeman

(10) Patent No.: US 6,703,975 B1
(45) Date of Patent: Mar. 9, 2004

(54) WIDEBAND PERIMETER CONFIGURED INTERFEROMETRIC DIRECTION FINDING ANTENNA ARRAY

(75) Inventor: Will Freeman, Ridgecrest, CA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 10/395,132

(22) Filed: Mar. 24, 2003

(51) Int. Cl.[7] .................... H01Q 21/06; H01Q 21/24; H04B 7/10
(52) U.S. Cl. .......................... 342/361; 343/705
(58) Field of Search ............................. 342/361, 362, 342/363, 364, 365, 366; 343/705, 708

(56) References Cited

U.S. PATENT DOCUMENTS 3,594,802 A * 7/1971 Koob .................... 343/705
5,202,697 A * 4/1993 Bonebright et al. ........ 343/770

\* cited by examiner

*Primary Examiner*—Theodore M. Blum
(74) *Attorney, Agent, or Firm*—David S. Kalmbaugh

(57) ABSTRACT

An antenna array includes two pairs of linear polarized antennas mounted to a perimeter portion of an airframe with one pair having a polarization normal to the airframe and the other pair having a polarization tangential to the airframe. The antenna array eliminates the cross-polarization problem of an electromagnetic wave incident upon the array when using linear polarized perimeter mounted antennas.

13 Claims, 2 Drawing Sheets

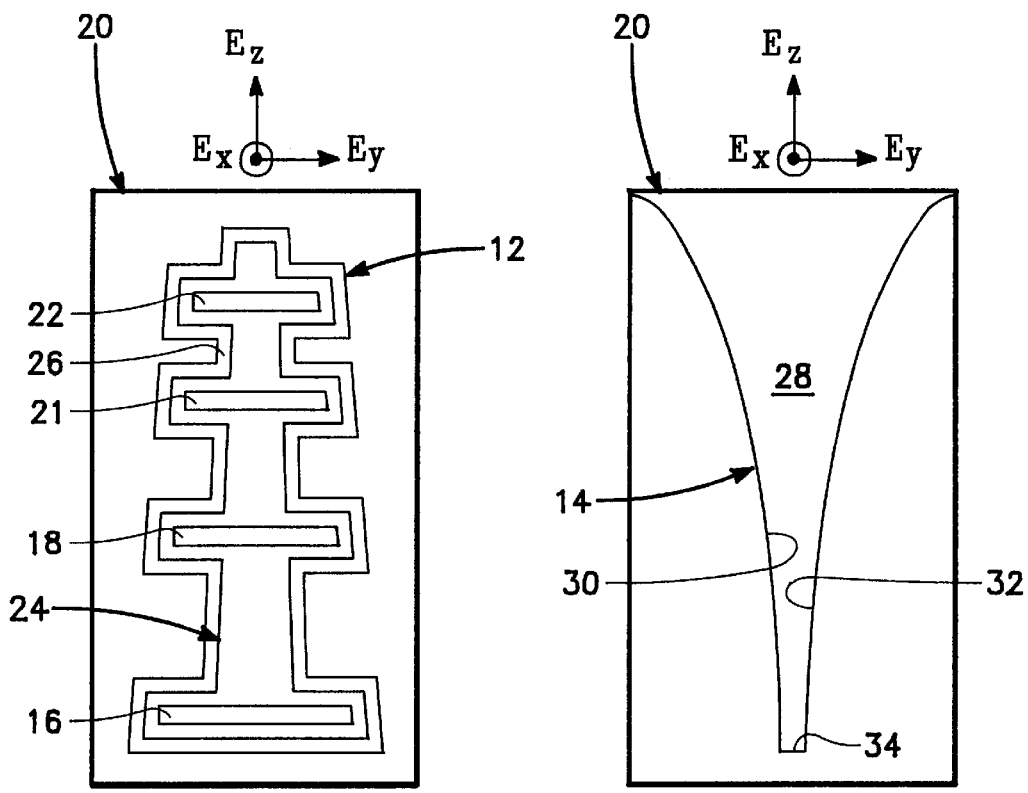
*FIG. 2A*  *FIG. 2B*
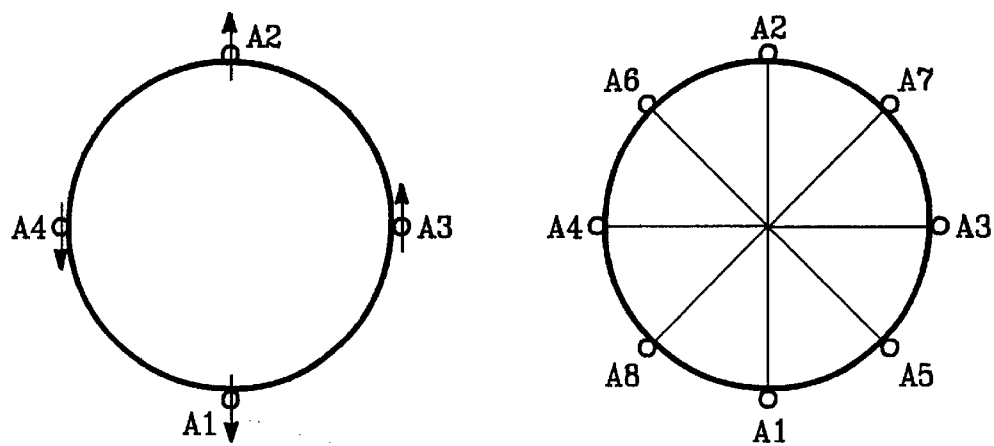
*FIG. 3*  *FIG. 4*

WIDEBAND PERIMETER CONFIGURED INTERFEROMETRIC DIRECTION FINDING ANTENNA ARRAY

BACKGROUND OF THE INVENTION

1. Field of the Invention

This invention relates generally to antenna arrays and particularly to antenna arrays for determining an angle of arrival of an incident electromagnetic wave. Still more particularly, this invention relates to an antenna array that is configured on a perimeter portion of an airframe

2. Description of the Prior Art

Previous interferometric direction finding antennas typically are either externally mounted on an airframe or are center configured. Externally mounted antennas are bulky and introduce aerodynamic drag that diminishes performance. Center configured antennas are difficult to use with other sensors. Center configured antennas can detect only one circular polarization (left or right), which limits their utility in that the opposite sense circular polarization (right or left) cannot be detected.

Suitable surface mounted antennas are linearly polarized, which creates a problem with tracking sources of different polarizations. When the airframe rolls, a linearly polarized antenna becomes cross-polarized relative to the incident wave, which causes the antenna to produce no signal or a noisy low power signal in response to the cross-polarized wave.

SUMMARY OF THE INVENTION

The present invention overcomes problems associated with prior art direction finding antenna arrays and solves the cross-polarization problem by using pairs of antennas having different linear polarizations such that no incident polarization can be cross-polarized. The preferred arrangement of an antenna array according to the present invention includes two pairs of linear polarized antennas with one pair having a polarization normal to the airframe and the other pair having a polarization tangential to the airframe.

An object of the invention is to provide a perimeter configured direction finding (DF) antenna array that is capable of providing orthogonal plane direction finding and polarization diversity over a wide bandwidth.

A direction finding antenna array according to the invention comprises a first pair of linearly polarized antennas mounted on opposite sides of a perimeter portion of an airframe such that their polarizations are tangentially directed and are perpendicular to a longitudinal axis of the airframe. A second pair of linearly polarized antennas is mounted to the airframe such their polarizations are normally directed and such that each of the second pair of antennas is equidistant from the first pair of antennas.

The first and second antennas may be formed as log periodic folded slot antennas.

The third and fourth antennas may be formed as flared notch antennas. Alternatively, the third and fourth antennas may be formed as log periodic folded dipole antennas or other log periodic type antenna.

A method according to the invention for determining an angle of arrival θ of an electromagnetic wave having a wave polarization that is incident upon an antenna array mounted to a perimeter portion of an airframe comprises the steps of mounting a first pair of linearly polarized antennas on opposite sides of a perimeter portion of an airframe such that their polarizations are tangentially directed and are perpendicular to a longitudinal axis of the airframe, and mounting a second pair of linearly polarized antennas to the airframe such their polarizations are normally directed and such that each of the second pair of antennas is equidistant from the first pair of antennas. The method of the invention further comprises the step of determining the angle of arrival θ measuring phase differences $\Delta\Psi = \Psi_2 - \Psi_1 = (2\pi/\lambda d_2 \sin\theta + \alpha_2) - (2\pi/\lambda d_1 \sin\theta + \alpha_1)$, $\alpha_1$ and $\alpha_2$ being phase angles of normalized complex voltages $v_1$, and $v_2$ given by:

$$v_1 = e_w \cdot e_{a1}{}^* = e^{j\alpha_1} \quad (1)$$

and $$v_2 = e_w \cdot e_{a2}{}^* = e^{j\alpha_2} \quad (2)$$

with $e_w$ and $e_a$ representing complex vectors of the wave and antenna polarizations, respectively.

The structure and function of the invention may be best understood by referring to the accompanying drawings, which are not to scale, and to the following detailed description.

For a continuously rotating airframe, the phase difference is:

$$\psi = \frac{2\pi}{\lambda} d \, \sin\theta_{source} \cos\phi_{roll} \quad (3)$$

where $\phi_{roll}$ is the roll angle. The unambiguous angle of arrival can be determined using the expression:

$$\theta_{source} = \arcsin\left[\frac{\lambda}{4\pi d}\psi_{p-p}\right] \quad (4)$$

$\phi_{source}$ is determined by peak or zero locations where $\Psi_{p-p}$ is the peak to peak value of the unwrapped phase difference in co-polarized regions of the two antenna pairs that have been spliced together effectively replacing the cross-polarized regions. Co-polarized regions are regions throughout a roll that are within 3 dB down from perfectly co-polarized points.

Alternatively, amplitude comparison may be used to solve ambiguities if sufficient squint is obtained. Side by side antennas may be used to solve the ambiguities. Array processing or monpulse techniques may be used.

BRIEF DESCRIPTION OF THE DRAWINGS

FIG. 2A illustrates a first antenna element that may be included in the perimeter configured antenna array of FIG. 1;

FIG. 2B illustrates a second antenna element that may be included in the perimeter configured antenna array of FIG. 1;

FIG. 3 illustrates antenna element polarizations configured in the array; and

FIG. 4 illustrates antenna element locations for a perimeter configured antenna array having eight antenna elements.

DETAILED DESCRIPTION OF THE INVENTION

Figure 1:
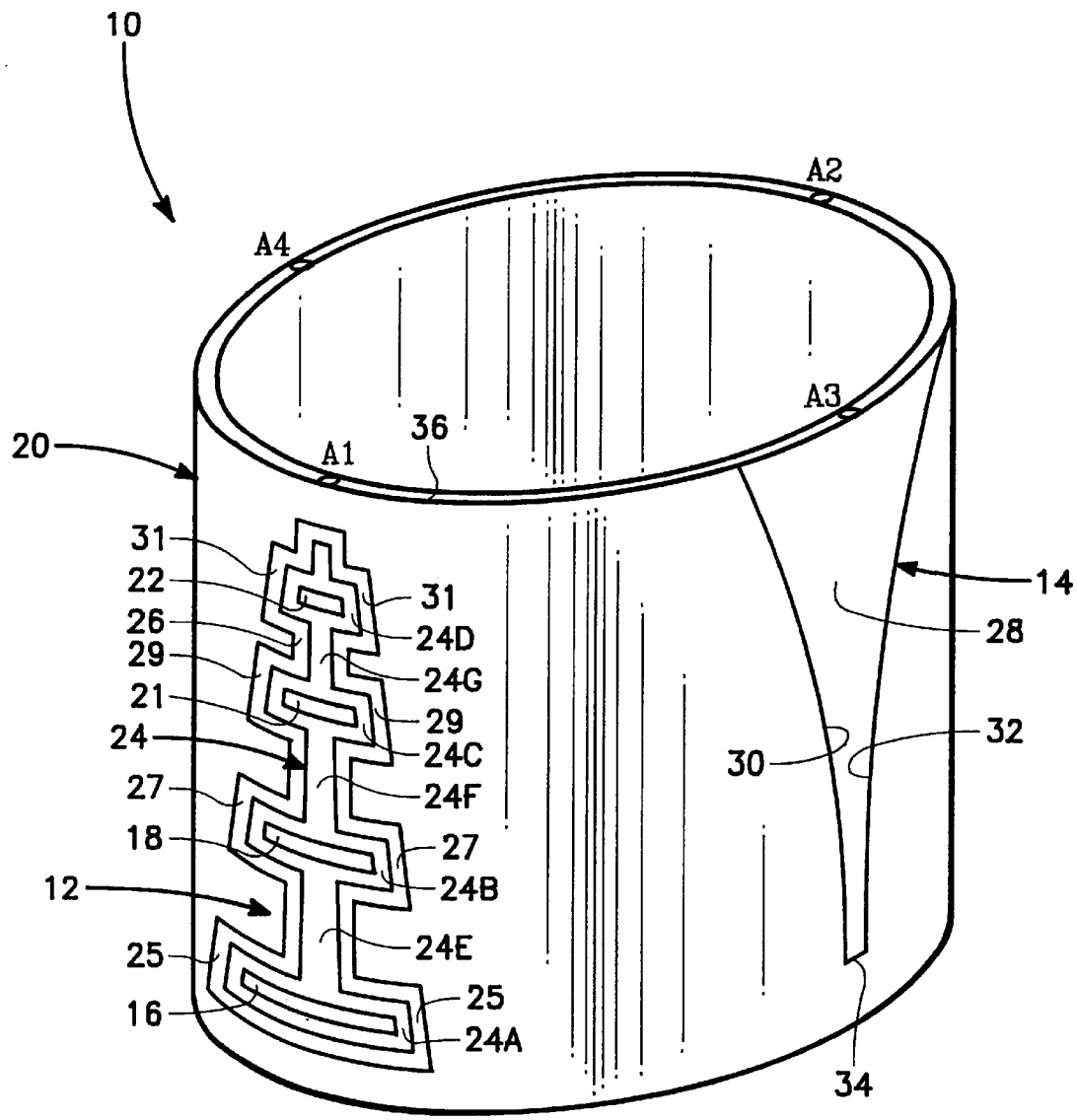
FIG. 1 illustrates a four-element perimeter configured antenna array according to the present invention.

Referring to FIGS. 1 and 2, a perimeter antenna array 10 includes a first log periodic folded slot (LPFS) antenna 12 formed on a surface 20 adjacent an antenna location A1. LPFS antennas are well known in the art. A second LPFS antenna that preferably is substantially identical to LPFS 12 is formed on surface 20 adjacent an antenna location A2 that is diametrically opposite antenna location A1.

Surface 20 typically is an exterior portion of an airframe that is illustrated as being cylindrical only for convenience in describing the features of antenna array 10. Antenna array 10 may configured conformally to an exterior portion of an airframe for a missile or other platform which may for example be an aircraft or it may be enclosed in a radome (not shown). Surface 20 is not limited to a cylindrical geometry, but instead may have any shape that is convenient for forming an airframe of a missile (not shown) or other platform (not shown).

A first flared notch antenna 14 is formed on cylindrical surface 20 adjacent an antenna location A3 that is midway between antenna locations A1 and A2. Flared notch antennas (also called Vivaldi antennas) are also well known in the art. A second flared notch antenna that is preferably substantially identical to flared notch antenna 14 is formed on cylindrical surface 20 at an antenna location A4 that is diametrically opposite from antenna location A3. Therefore, it may be seen that antenna locations A1–A4 are spaced apart by 90° arcs on cylindrical surface 20.

Referring to FIGS. 1 and 2A, folded slot antenna 12 includes a series of spaced apart folded slots 25, 27, 29 and 31 whose distances from a common origin form a geometric progression. The slots 25, 27, 29 and 31, which are radiating slots, are adjacent conducting elements 24A, 24B, 24C and 24D. The lengths, and hence the resonant frequencies of the slot 25, 27, 29 and 31 also form the same geometric progression. The folded slots 25, 27, 29 and 31 are formed in the area adjacent elements 24A, 24B, 24C and 24D in areas which are etched to expose the dielectric. The slots are etched in pairs as shown in FIG. 1. and when folded form a mirror image of one another. The specific embodiment illustrated is merely an example of a possible structure for folded slot antenna 12.

There are also phasing slots 16, 18, 21 and 22 which are dielectric regions inside an electrically conductive layer 24. Phasing slots 16, 18, 21 and 22 are filled with a dielectric material. In the elevation view of FIG. 2A, phasing slots 16, 18, 21 and 22 appear to have trapezoidal shapes. However, because phasing slots 16, 18, 21, and 22 conform to the surface of layer 24, which is shown to be curved in the form of a cylinder, the surface of phasing slots 16, 18, 21 and 22 are curved. The phasing slots 16, 18, 21, and 22 have lengths that form the same geometric progression as their spacings.

At this time it should be noted that phasing slots 16, 18, 21 and 22 are normally present in LPFS antennas, however these phasing slots may be omitted in embodiment illustrated in FIG. 1. The phasing slots 16, 18, 21 and 22 are not critical to the operation of the present invention, rather it is the folded slots 25, 27, 29 and 31 which are required for the operation of antenna array 10 comprising the present invention.

It should also be noted that while only four arms are shown on the embodiment depicted in FIG. 1, it is possible to design an antenna array which uses substantially more folded slots than the antenna array depicted in FIG. 1.

Electrically conducting section 24 is surrounded by a dielectric border 26 that separates electrically conducting section 24 from surface 20, which is also electrically conductive. Electrically conducting section 24 includes a plurality of conducting elements 24A, 24B, 24C and 24D that surround corresponding phasing slots 16, 18, 21 and 22. A conducting strip 24E extends between conducting elements 24A and 24B. Similar conducting strips 24F and 24G extend between conducting elements 24B and 24C and conducting elements 24C and 24D.

Flared notch antenna 14 is formed as a dielectric region 28 formed on the surface 20. Dielectric region 28 has sides 30 and 32 that are separated by a distance that increases from a narrow end 34 to a wide end 36.

FIG. 2A shows the Cartesian coordinated for LPFS antenna 12. FIG. 2B shows the Cartesian coordinates for flared notch antenna 14. Antenna polarization may be conveniently defined as the orientation that the electric field vector in an incident electromagnetic wave must have for maximum gain. In both FIGS. 2A and 2B the radiating pattern of the antennas 12 and 14 are Z-directed. The electric field of LPFS antenna 12 has primarily only an x-component Ex whereas the electric field of flared notch antenna has primarily only a y-component Ey. These two polarizations are orthogonal when antennas 12 and 14 are oriented as shown in FIGS. 2A and 2B.

When the antenna array 10 has antennas 12 and 14 oriented as shown in FIG. 1 and placed at the antenna locations A1–A4 as described above, the polarizations are aligned as shown by the arrows in FIG. 3. This perimeter configuration allows for the unambiguous source angle of arrival.

The phase difference between a baseline pair of antennas is $$\psi = \frac{2\pi d}{\lambda}\sin\theta \tag{5}$$

where $\lambda$ is the wavelength, $\theta$ is the angle of arrival of an incident electromagnetic wave and d is the distance between the antennas. The angle of arrival of an incident wave can be determined unambiguously if the baseline separation (d) is not more than $\lambda/2$. In the present invention, the antenna array 10 typically may be located on the perimeter of an airframe so that the distance between antennas may be many wavelengths long. Therefore, if only baseline phase measurements are made, the angle of arrival will be ambiguous. Ambiguities in angle of arrival can be resolved by measuring the change of phase $\Delta\Psi$ as antenna array 10 is rotated from a first angular orientation to a second angular orientation indicated in subsequent equations by corresponding subscripts 1 and 2. Antenna array 10 may be rotated by rotating the airframe to which the antenna array 10 is mounted or by mechanical rotation of antenna array 10. The phase change may be written as:

$$\Delta\Psi=\Psi_2-\Psi_1 \tag{6}$$

where $\Psi_1=2\pi/\lambda d_1 \sin\theta+\alpha_1$ and $\Psi_2=2\pi/\lambda\, d_2 \sin\theta+\alpha_2$ and $\alpha_1$ and $\alpha_2$ are phase angles of normalized complex voltages $v_1$, and $v_2$ given by:

$$v_1=e_w\cdot e_{a1}{}^*=e^{j\alpha_1} \tag{7}$$

and $$v_2=e_w\cdot e_{a2}{}^*=e^{j\alpha_2} \tag{8}$$

with $e_w$ and $e_a$ representing complex vectors of the wave and antenna polarizations, respectively.

The symbols $e_w$ and $e_a$ represent the complex vectors of the wave and antenna polarizations, respectively. The angle of arrival θ can be determined unambiguously from the expression for the change of phase ΔΨ.

Rotation of the antenna array 10 also provides polarization diversity. The antenna array 10 experiences co-polarization and cross-polarization throughout a roll. Comparing amplitudes of the received signal allows for a determination of when the antennas are co-polarized or sufficiently matched to make good phase measurements. The phase difference between baseline pairs of antennas is ignored near or at cross-polarization. Therefore rotation of antenna array 10 provides for the capability of using the antenna array 10 to direction find on any received polarization (linear, slant, right hand circular, left hand circular and elliptical).

For a continuously rotating airframe, the phase difference is:

$$\psi = \frac{2\pi}{\lambda} d \, \sin\theta_{source} \cos\phi_{roll} \qquad (9)$$

where $\phi_{roll}$ is the roll angle. The unambiguous angle of arrival can be determined using the expression:

$$\theta_{source} = \arcsin\left[\frac{\lambda}{4\pi d}\psi_{p-p}\right] \qquad (10)$$

$\phi_{source}$ is determined by peak or zero locations where $\Psi_{p-p}$ is the peak to peak value of the unwrapped phase difference in co-polarized regions of the two antenna pairs that have been spliced together effectively replacing the cross-polarized regions. Co-polarized regions are regions throughout a roll that are within 3 dB down from perfectly co-polarized points.

Alternatively, amplitude comparison may be used to solve ambiguities if sufficient squint is obtained. Side by side antennas may be used to solve the ambiguities. Array processing or monopulse techniques may be used.

Referring to FIG. 4, polarization diversity may be achieved by using another set of four antennas like the array 10 of FIG. 1 at antenna locations A1–A8 spaced apart by 45° if enough space is available around the perimeter of the airframe. Alternatively, a six element array may comprise the antenna array.

Antenna array 10 may be configured conformally to the outer surface of a missile or enclosed by a radome. A cylindrical geometry has been described for simplicity; however, antenna array 10 may be configured on irregular shaped airframes. Flared notch antenna 14 may be replaced by a log periodic folded dipole antenna (not shown) by interchanging the conducting and dielectric portions of the LPFS antenna 12. Either machining or printed circuit board techniques may be used in forming the antenna array 10.

The antenna elements can be either etched copper antenna elements or mechanically constructed antenna elements. The polarization of the antenna elements of antenna array 10 is critical to the operation of antenna array 10, the type of antenna elements used on antenna array 10 may vary.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A direction finding antenna array mounted on a perimeter portion of an airframe, comprising:

a first antenna mounted to the airframe such that said first antenna has a first polarization that is perpendicular to a longitudinal axis of said airframe;

a second antenna mounted to said airframe opposite from said first antenna such that said second antenna has a second polarization that is perpendicular to said longitudinal axis of said airframe, wherein said first and second antennas are log periodic folded slot antennas;

a third antenna mounted to said airframe equidistant from said first and second antennas; and a fourth antenna mounted to said airframe opposite from said third antenna, said third and fourth antennas having third and fourth polarizations, respectively, that are perpendicular to said longitudinal axis of said airframe, wherein said third and fourth antennas are flared notch antennas.

2. The direction finding antenna array of claim 1 wherein said perimeter portion of said airframe is formed generally as a hollow cylinder with said first, second, third and fourth antennas being spaced apart.

3. The direction finding antenna array of claim 1 wherein said first, second, third and fourth antennas comprise etched copper antennas.

4. The direction finding antenna array of claim 1 wherein said first, second, third and fourth antennas comprise mechanically fabricated antennas.

5. A method for determining an angle of arrival θ of an electromagnetic wave having a wave polarization that is incident upon an antenna array mounted to a perimeter portion of an airframe, comprising the steps of:

mounting a first antenna mounted to the airframe such that said first antenna has a first antenna polarization that is perpendicular to a longitudinal axis of said airframe;

mounting a second antenna mounted to said airframe opposite from said first antenna such that said second antenna has a second antenna polarization that is perpendicular to said longitudinal axis of said airframe;

mounting a third antenna mounted to said airframe equidistant from said first and second antennas;

mounting a fourth antenna mounted to said airframe opposite from said third antenna, said third and fourth antennas having third and fourth antenna polarizations, respectively, that are perpendicular to said longitudinal axis of said airframe;

determining said angle of arrival θ by measuring phase differences $\Delta\Psi=\Psi_2-\Psi_1=(2\pi/\lambda d_2 \sin \theta+\alpha_2)-(2\pi/\lambda d_1 \sin \theta+\alpha_1)$ with $\alpha_1$ and $\alpha_2$ being phase angles of normalized complex voltages $v_1$, and $V_2$ given by:

$$v_1 = e_w \cdot e_{a1}^* = e^{j\alpha_1} \qquad (1)$$

and $$v_2 = e_w \cdot e_{a2}^* = e^{j\alpha_2} \qquad (2)$$

with $e_w$ and $e_a$ representing complex vectors of the wave and antenna polarizations, respectively.

6. The method of claim 5 wherein a phase difference for a continuously rotating airframe, is given by:

$$\psi = \frac{2\pi}{\lambda} d\, \sin\theta_{source}\cos\phi_{roll} \tag{9}$$

where $\phi$ is a roll angle, and the unambiguous angle of arrival $\theta_{source}$ is determined using the expression:

$$\theta_{source} = \arcsin\left[\frac{\lambda}{4\pi d}\psi_{p-p}\right] \tag{10}$$

and $\phi_{source}$ is determined by peak or zero locations and $\Psi_{p\text{-}p}$ is a peak to peak value of an unwrapped phase difference in co-polarized regions of two antenna pairs that are spliced together.

7. The method of claim 5, further comprising the steps of:
   forming said first and second antennas as log periodic folded slot antennas; and
   forming said third and fourth antennas as flared notch antennas.

8. The method of claim 5, further comprising the steps of:
   forming said first and second antennas as log periodic folded slot antennas; and
   forming said third and fourth antennas as log periodic folded dipole antennas.

9. The method of claim 5, further comprising the step of fabricated said first, second, third and fourth antennas from etched copper.

10. A direction finding antenna array mounted on a perimeter portion of an airframe, comprising:

a first antenna mounted to the airframe such that said first antenna has a first polarization that is perpendicular to a longitudinal axis of said airframe;

a second antenna mounted to said airframe opposite from said first antenna such that said second antenna has a second polarization that is perpendicular to said longitudinal axis of said airframe, wherein said first and second antennas are log periodic folded slot antennas;

a third antenna mounted-to said airframe equidistant from said first and second antennas; and a fourth antenna mounted to said airframe opposite from said third antenna, said third and fourth antennas having third and fourth polarizations, respectively, that are perpendicular to said longitudinal axis of said airframe, wherein said third and fourth antennas are log periodic folded dipole antennas.

11. The direction finding antenna array of claim 10 wherein said perimeter portion of said airframe is formed generally as a hollow cylinder with said first, second, third and fourth antennas being spaced apart.

12. The direction finding antenna array of claim 10 wherein said first, second, third and fourth antennas comprise etched copper antennas.

13. The direction finding antenna array of claim 10 wherein said first, second, third and fourth antennas comprise mechanically fabricated antennas.

* * * * *